United States Patent [19]
Birenheide

[11] Patent Number: 5,315,878
[45] Date of Patent: May 31, 1994

[54] MEASURING HEAD FOR A PRESSURE-MEASURING DEVICE WITH A PRESSURE SENSOR FOR THE SIMULTANEOUS ACTUATION OF A SWITCHING CONTACT

[75] Inventor: Torsten Birenheide, Krummesse, Fed. Rep. of Germany

[73] Assignee: Dragerwerk AG, Lubeck, Fed. Rep. of Germany

[21] Appl. No.: 1,164

[22] Filed: Jan. 7, 1993

[30] Foreign Application Priority Data

Feb. 21, 1992 [DE] Fed. Rep. of Germany ....... 4205264

[51] Int. Cl.$^5$ ............................ G01L 7/08; G01L 9/06
[52] U.S. Cl. .................................. 73/727; 200/83 N; 338/4; 338/42
[58] Field of Search ................. 73/727, 726, 724, 718, 73/717, 719, 720, 721, 722, 723, 725, 726, 728, 714, ; 200/83 N; 340/626; 361/283.1-283.4; 338/4, 42

[56] References Cited

U.S. PATENT DOCUMENTS

| | | | |
|---|---|---|---|
| 3,735,376 | 5/1973 | Kermer et al. | 340/626 |
| 4,613,851 | 9/1986 | Hines | 340/626 |
| 4,759,222 | 7/1988 | Hattori | 340/626 |
| 4,827,240 | 5/1989 | Häfner | 338/4 |
| 4,906,977 | 3/1990 | Heuy-Jeng | 340/626 |

FOREIGN PATENT DOCUMENTS

2332249 1/1975 Fed. Rep. of Germany .
7606153 2/1981 Fed. Rep. of Germany .

Primary Examiner—Donald O. Woodiel
Attorney, Agent, or Firm—McGlew and Tuttle

[57] ABSTRACT

A pressure-measuring head for measuring the pressure of a fluid consists of a membrane-like diaphragm (6), which separates a pressure chamber (4) from a reference chamber (7), to which the pressure-sensitive elements, e.g., thick-film resistors or strain gauges, are applied. Under the effect of the pressure in the pressure chamber, these pressure-sensitive elements perform a deflection which is proportional to the pressure occurring in the pressure chamber. An electric contact is switched during simultaneous displacement of the membrane (6) arranged in a sensor housing by a predeterminable distance (19) after a defined pressure value has been reached in the pressure chamber. A measuring head of such a design is also able to assume a swithing function without additional auxiliary energy, besides sending an electrically processable pressure signal.

7 Claims, 3 Drawing Sheets

MEASURING HEAD FOR A PRESSURE-MEASURING DEVICE WITH A PRESSURE SENSOR FOR THE SIMULTANEOUS ACTUATION OF A SWITCHING CONTACT

FIELD OF THE INVENTION

The present invention pertains to a measuring head for a pressure-measuring device for a fluid (gas, liquid), from which a signal proportional to the pressure to be measured can be obtained via a sensor element by arranging the sensor element as a flat diaphragm on a sensor housing, as a result of which a pressure chamber is separated from a reference chamber, and by the diaphragm undergoing a deformation proportional to the pressure value as a consequence of the pressure occurring in the pressure chamber, and by an electrical signal that can be obtained as a measured pressure value being generated by the deformation.

BACKGROUND OF THE INVENTION

Controlling pressures in gases and liquids requires accurate measurement, and it also means that for monitoring at predeterminable pressure values, switching functions are performed, which trigger, e.g., safety-relevant measures on devices provided for that purpose. A prior-art measuring device of the above-described class is described under the name contact manometer in German Offenlegungsschrift No. DE-OS 23,32,249. Such contact manometers have a mechanical pressure-measuring mechanism, by which the pressure value measured is indicated with a pointer and a dial. To monitor and regulate the pressure, this mechanical pressure indicator is provided with an attachable switching contact, which is actuated depending on the position of the pointer (normally closed contact or normally open contact). On actuation of the switching contact, corresponding information, on the basis of which necessary measures lead to control or even shut-off of the pressurized fluid lines, is sent to a central station via an electric signal line. It is disadvantageous in the mechanically operating display mechanisms with a coupled electrical switching device that the monitoring stations are usually arranged centrally and are therefore at a great distance from the actual measuring point. It is therefore impossible to monitor the pressure lines and to simultaneously measure the actually occurring pressure by means of the prior-art contact manometer. To overcome this shortcoming, the movement of the pointer would have to be converted with complicated technical and electrical means into an analog electrical signal and forwarded. The mechanical system required for this would be complicated, and the accuracy of reading the mechanical display mechanism would be impaired.

A measuring device for determining the pressure of a fluid, which comes closet to the subject of the present invention, is described in German Utility Patent No. DE-GM 76,06,153. An elastic membrane covers a pressure chamber in a pressure-tight manner. On the surface facing away from the pressure chamber, the membrane is provided with strain gauges, which convert the deflection of the membrane generated by the pressure occurring in the pressure chamber into an electrical signal, which is sent to an evaluating unit via (electrical) wires. Even though such pressure sensors make it possible to monitor the pressure signal generated such that a switching function is triggered at a predeterminable pressure value, and this switching function actuates the switching devices that may be necessary, this type of signal processing does have the disadvantage that the electrical pressure signal must continuously be evaluated and monitored via downstream signal processing units, even when the pressure values are far below the predetermined pressure value. The continuous signal monitoring and processing requires unnecessary auxiliary energy for operating amplifier and comparator circuits, which are not needed per se for normal pressure measurement.

SUMMARY AND OBJECTS OF THE INVENTION

Therefore, the primary object of the present invention is to improve a measuring device of the above-described class such that in addition to sending an electrically processable pressure signal, it is also able to perform a switching function without additional auxiliary energy, wherein the pressure measurement is performed only after the switching function has been performed.

This task is accomplished by the diaphragm being provided with a contact surface which is engaged with an electrical switching contact that is stationary relative to the movement of the diaphragm after a predeterminable deflection of the diaphragm, and by the diaphragm being blocked after the deflection has been reached, so that the deformation which now develops under the effect of the pressure occurring in the pressure chamber will now generate the electrical signal that can be obtained as a measured pressure value.

The advantage of the present invention is essentially the fact that the electrical measuring devices available for the normal measuring operation, beginning from the sensor element to the signal display, are continuously available without additional auxiliary energy. The monitoring function of the measuring device is activated and electricity is needed for performing the monitoring functions only when the deflection of the diaphragm as a consequence of the pressure effect in the pressure chamber reaches such a value that the contact surface actuates the switching contact. After the switching function has been performed, the circuit for the pressure measurement is put into operation in order to perform the measuring function. Consequently, no zero signal current is needed prior to the actuation of the switching contact. The mere fact that a contact surface is arranged does not impair either the accuracy or the response time of the pressure-sensing sensor element. The contact surface can close or open the switching contact after displacement over the predetermined path, depending on the needs and the design of the electrical switching circuit (normally open contact, normally closed contact).

One particularly suitable field of application for the present invention is offered in devices supplied with pressurized gas (gas masks and breathing equipment), in which electrical/electronic components are to be switched on automatically, e.g., after opening pressurized gas cylinders, in order to monitor, among others, the pressure in the cylinder.

The contact surface may preferably be connected to the evaluation unit via electric lines, so that the switching signal is sent when the contact surface comes into contact with the stationary electrical switching contact. The line connection with the contact surface may be applied in the same manner as in the case of, e.g., the application of resistor layers for pressure measurement on the surface of the diaphragm. However, if any electrical contacting is to be avoided within the sensor housing, it is favorable for the diaphragm to carry at least one permanent magnet, which is designed, e.g., as a flat strip and is brought into functional connection with a Reed contact after the predeterminable deflection has been reached. Any electrical switching connection within the sensor housing is thus avoided.

In another embodiment of the measuring device, the diaphragm is designed as the bottom of a pot-shaped sensor housing, which is displaceably accommodated in the pressure chamber and separates the pressure chamber from the reference chamber in a pressure-tight manner. The sensor housing is supported by an elastic element that counteracts the pressure and performs the displacement needed for actuating the switching contact under the effect of the pressure occurring in the pressure chamber. The sensor housing can have a robust and mechanically stable design, and only the bottom of the pot needs to be designed as a sensitive sensor membrane. The switching function and the sensor function are functionally uncoupled from one another, so that the pressure sensor itself can be designed corresponding to its intended measuring function, without the need to fear any hindering or limitation of the sensor surface because of the arrangement of a contact surface. The displacement to be performed for actuating the switching contact can be defined independently from the deflection of the diaphragm membrane, because only the movement of the sensor pot is to be taken into account. This movement is easy to control and reproduce, so that constant feed paths must be bridged in all cases. The elastic element may be designed as a pressure spring, and the measuring device can be calibrated to different pressure values, at which the switching contacts are to be actuated, by simply replacing the spring with another spring with different spring rate, while maintaining the same sensor pot.

In a simple design of the sensor housing, the sensor housing is cylinder-shaped and is accommodated as a pressure chamber axially movably in the reference chamber, and one of the end faces of the cylinder edge is in contact with the pressure spring supported by the reference chamber. The cylinder-shaped pressure chamber can be accommodated in the reference chamber with simple means, e.g., with an O-ring, and is able to actuate the switching contact due to its axial movement, following the pressure in the pressure chamber, against the pressure effect of the pressure spring, by one of its end faces striking a stop on the support ring of the reference chamber. To embody the pressure switch, the sensor housing now needs to be designed only as a housing that is electrically insulated from the reference chamber, so that the switching contact is grounded after the end face of the cylinder edge comes into contact with the support ring, and the pressure switch is thus actuated.

In another advantageous embodiment of the measuring device, the diaphragm is designed as a membrane which performs lifting movements, is clamped in a pressure-tight manner between the pressure chamber and the reference chamber, and whose deflection, performed under the action of the pressure in the pressure chamber, actuates the switching contact, and the deformation of the membrane surface after the predetermined deflection has been reached forms the indicator for the pressure occurring in the pressure chamber. This embodiment is characterized by the possibility of eliminating additional moving parts and of using the deflection of the membrane as the only indicator for both the pressure measurement and for actuating the pressure switch. The membrane has, e.g., between its membrane surface and the clamping point in the housing, an elastic bead as a suspension means, which leaves the membrane in its resting position in the absence of pressure effect, and the membrane is displaced against the restoring force of the bead as soon as a pressure builds up, until the membrane performs the necessary deflection in order to actuate the switching contact. Reversible bending elasticity, which permits the necessary deflection under pressure effect and the return of the membrane into its original starting position on pressure drop, can be achieved by proper selection of the material for the bead and by shaping it suitably, as well as due to the manner of fastening of the membrane on the housing.

Suitable materials for the diaphragm include especially ceramic oxides, to which thick-film resistors are applied and are electrically connected to a resistance-measuring bridge; it is also possible to additionally apply electrical amplifier circuits for further processing the pressure signal according to the thin-film technology. If the material selected for the diaphragm is a metal membrane, strain gauges for generating the signals proportional to the deflection may be applied to it.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
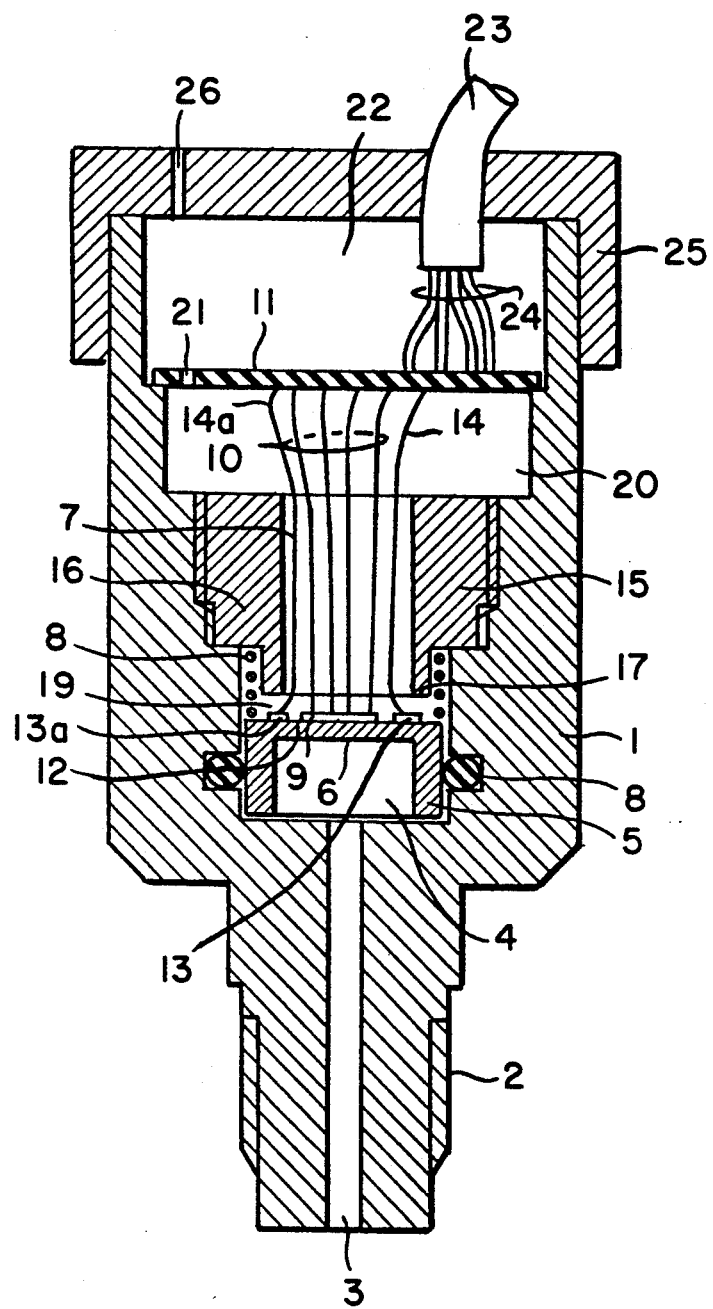
FIG. 1 is a sectional view taken through the measuring head with a displaceable sensor housing according to the invention.

The measuring head shown in FIG. 1 has as the basic body a sensor head 1, which can be connected to a pressurized gas tank, not shown, or a line system carrying pressurized gas via a threaded connection 2. The pressure to be monitored is admitted into a pressure chamber 4 by means of a pressure duct 3 in the threaded connection 2. The pressure chamber 4 contains a cylinder-shaped sensor housing 5 which has a pot-shaped design and has a sensor element 6 as a bottom, which can be considered, from the viewpoint of the gas to be measured, as a diaphragm between the pressure chamber 4 and a connected reference chamber 7. The sensor housing 5 is accommodated axially movable within the sensor head 1 and is sealed against the pressure chamber 4 by an O-ring 8. The sensor element 6 carries, on its surface facing the reference chamber 7, resistor strips 9 applied according to the thick-film technology, which are connected to a resistance-measuring bridge and form the actual pressure sensor. The thick-film resistors 9 are connected to a printed circuit board 11 for further processing via sensor lines 10. The end face 12 of the cylindrical sensor housing 5 carries two contact surfaces 13, 13a, which lie on it in an annular form and are in turn connected to the printed circuit board 11 via wires 14, 14a. A support ring 15, which forms with its neck 16 the electrical switching contact 17 for the contact surfaces 13, 13a, is screwed into the reference chamber 7. The sensor housing 5 is brought to a spatial distance from the neck 16 by a pressure spring 18, which is supported against the support ring 15, so that the contact surfaces 13, 13a are located at a distance 19, in the form of a deflection, from the electrical switching contact 17. Since the pressure duct 3 opens into the pressure chamber 4 with a diameter that is smaller than the diameter of the sensor housing 5, the sensor housing 5 is supported in the pressure chamber 4 against the bottom of the pressure chamber. Thus, the sensor housing 5 is accommodated within the sensor head 1 slidingly displaceable over the distance 19 via the O-ring seal 8. The sensor feed lines 10 as well as the wires 14, 14a are connected on the printed circuit board 11 to further electronic units used for signal processing. The printed circuit board 11 is accommodated in a board chamber 20, which is connected to the reference chamber 7. The printed circuit board 11 is provided with a bore 21, which establishes a pressure connection between the board chamber 20 and a connection chamber 22, in which a signal cable 23 with its signal lines 24 is also connected to the printed circuit board 11. The signal cable 23 is led through a closing cap 25, which separates the connection space 22 from the environment, but is in pressure connection with the environment via a pressure-equalizing duct 26. The environment may be under atmospheric pressure or a pressure different from the atmospheric pressure. When a differential pressure measurement is to be performed, the pressure-equalizing duct 26 is open, and when an absolute pressure measurement is to be performed, the connection chamber 22 is sealed in a pressure-tight manner or evacuated.

When pressure is admitted with the pressure occurring in the pressurized gas tank, not shown, via the pressure duct 3, the sensor housing 5 in the O-ring 8 is slidingly moved toward the neck 16 of the support ring 15 by the distance 19 when a defined predeterminable value, which is determined by the force of the pressure spring 18, is reached. The sensor housing 5 is made of an electrically insulating material, so that the contact surfaces 13, 13a, which are connected to the printed circuit board 11 via the wires 14, 14a, are connected in an electrically conductive manner when the switching contact 17 is contacted. The resulting current flowing in the wires 14, 14a is sent to the printed circuit board 11 and, via the signal cable 23, to a monitoring device, not shown, which applies the supply voltage to the electrical measuring and amplifier circuit for the subsequent pressure measurement on the basis of the switching signal received.

After covering the distance 19 as a deflection of the diaphragm 6, the sensor housing 5 is blocked and prevented from deflecting farther due to the end face 12 of the sensor housing striking the neck 16. The pressure occurring in the pressure chamber 4 therefore causes the diaphragm 6 to bulge out, so that its curvature will generate a signal that is proportional to the pressure in the resistance bridge 9, and this signal is sent to the monitoring device for display or further processing via the sensor lines 10, the board 11, and the signal cable 23. When the actual pressure exceeds or drops below predeterminable pressure threshold values, the monitoring device either may trigger a warning, if desired, or the pressure-proportional signal may be used to regulate the pressure in the tube system by means of suitable final control elements.

Figure 2:
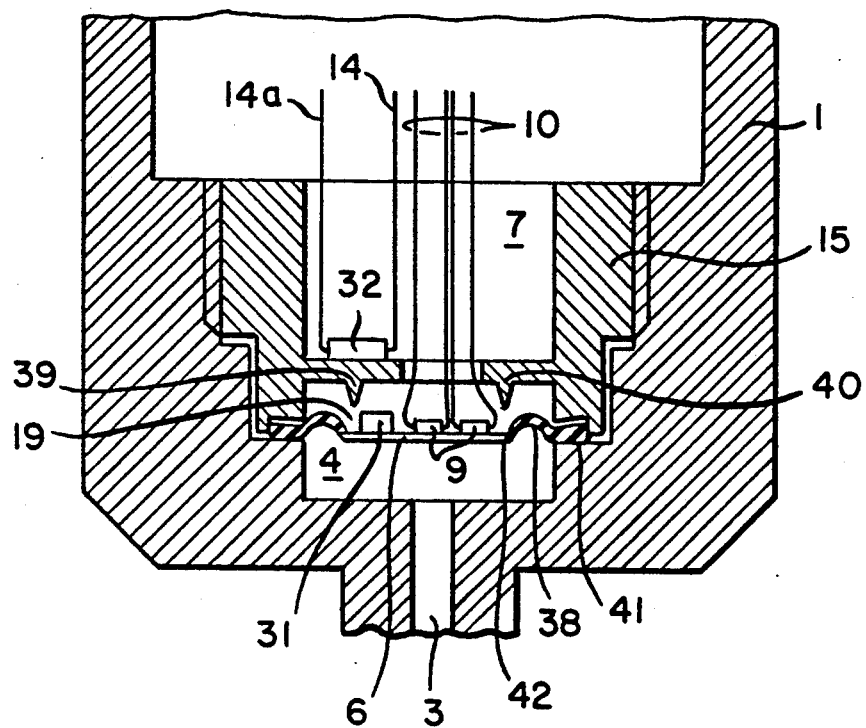
FIG. 2 is a partial sectional view of the measuring head with the pressure sensor as a membrane performing lifting movements.

FIG. 2 shows a partial section of the sensor head 1, which is represented only over the section extending from the pressure duct 3 to the reference chamber 7. Details which are identical to those in FIG. 1 are designated by the same reference numerals as in FIG. 1. The diaphragm consists of a clamping edge 41, a membrane bead 38 made of an elastomer, and the pressure-measuring membrane 6 made of metal or ceramic. The membrane is clamped in against the sensor head 1 with the clamping edge 41 with the support ring 15, which is screwed into the sensor head 1, and it separates the pressure chamber 4 from the reference chamber 7 in a pressure-tight manner. The deflection 19 of the pressure-measuring membrane 6, which takes place in the direction of the reference chamber 7 under the pressure effect in the pressure chamber 4, until the pressure-measuring membrane 6 strikes the annular support 39 at the web 40 of the support ring 15, is made possible by the movably elastic deformability of the membrane bead 38. The distance covered by the pressure-measuring membrane 6 from its resting position according to FIG. 2 into the end position according to FIG. 3 forms the deflection 19, which leads to actuation of the electrical switching contact 32, which is designed as a Reed contact with the corresponding the contact feed lines 14, 14a.

Figure 3:
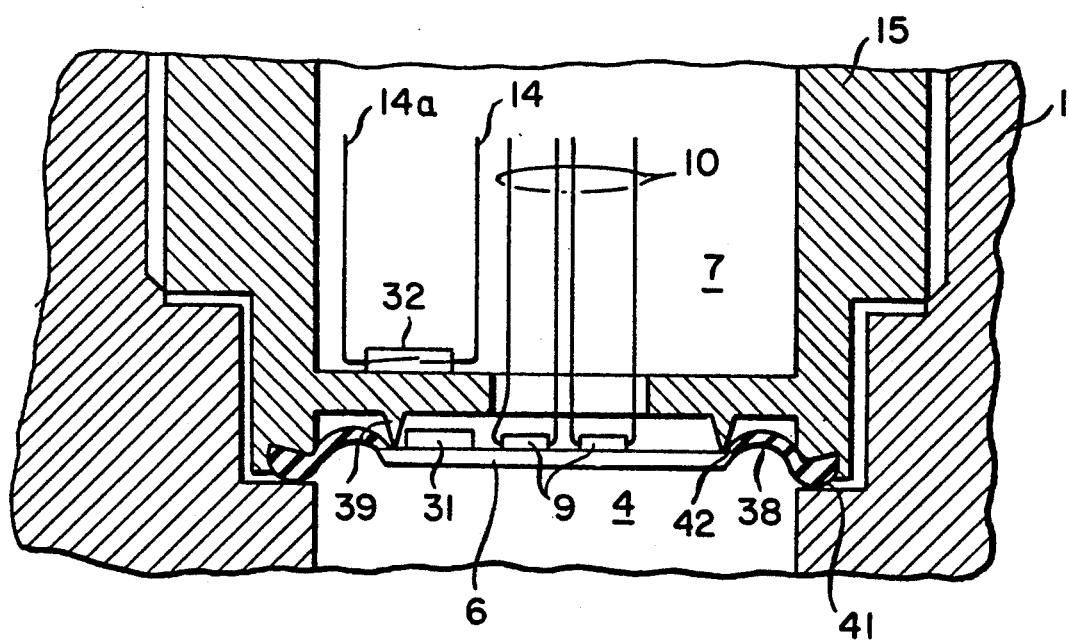
FIG. 3 is a detailed view of the membrane from FIG. 2.

FIG. 3 shows an enlarged, single representation of the pressure-measuring membrane 6 according to FIG. 2 after it has performed the deflection 19 under the effect of the pressure in the pressure chamber 4 and lies on the support 39. The pressure-measuring membrane 6 is extended in its edge zone by the membrane bead 38, whose clamped edge 41 is clamped between the sensor head 1 and the support ring 15. The limiter 40 is part of the support ring 15 and carries the Reed contact 32 as a switching contact, which is actuated by approaching a permanent magnet 31, which is arranged on the surface of the pressure-measuring membrane 6 facing the web 40 and closes the circuit represented symbolically by the two wires 14, 14a, as a result of which the supply voltage is applied from a power supply unit, not shown, via the sensor lines 10 to the strain gauges 9, which are connected to a measuring bridge, and whose expansion as a consequence of the pressure effect in the pressure chamber 4 generates a signal that is proportional to the pressure. The pressure-measuring membrane 6 itself consists of metal or ceramic, to the edge surface 42 of which the membrane bead 38 molded from a rubber-elastic material is vulcanized or bonded.

While specific embodiments of the invention have been shown and described in detail to illustrate the application of the principles of the invention, it will be understood that the invention may be embodied otherwise without departing from such principles.

What is claimed is:

1. Fluid pressure measuring device measuring head for obtaining a signal proportional to a pressure to be determined, comprising:
   a sensor housing with a fluid pressure inlet opening;
   a sensor element forming a flat diaphragm separating an interior of said sensor housing into a pressure chamber and a reference chamber, said flat diaphragm undergoing deformation proportional to a pressure value as a consequence of pressure occurring in said pressure chamber, said diaphragm having a contact surface for engagement with an electrical switching contact, said electrical switching contact being positioned stationarily relative to the movement of said diaphragm wherein said contact surface engages said electrical switching contact after said diaphragm has performed a predeterminable deflection, said diaphragm being blocked in a position corresponding to said predeterminable deflection and undergoing deformation under an effect of pressure occurring in said pressure chamber; and deformation sensing means connected to said diaphragm for generating an electrical signal based on said deformation, as a measured pressure value.

2. A measuring head according to claim 1, wherein: said contact surface includes permanent magnet disposed on said diaphragm, said permanent magnet being brought into functional connection with said electrical switching contact in the form of a reed contact, after said predeterminable deflection has been reached.

3. A measuring head according to claim 1, wherein: said diaphragm is formed of a pot-like sensor housing displaceably accommodated in said pressure chamber, separating said pressure chamber from said reference chamber in a pressure-tight manner, a bottom of said pot-like sensor housing being supported by an elastic element counteracting fluid pressure, said elastic element undergoing deformation for actuating said switching contact as a consequence of displacement under an effect of pressure occurring in said pressure chamber.

4. A measuring head according to claim 3, wherein: said pot-like sensor housing is cylindrically shaped and accommodated as a pressure chamber in said sensor head, axially displaceable relative to said reference chamber, said pot-like sensor housing having a cylindrical edge end face in contact with said elastic element in the form of a pressure spring which is supported by a support ring of said reference chamber, said end face and a stop on said support ring cooperating to form said contact surface and said switching contact more respectively.

5. A measuring head according to claim 3, wherein: said diaphragm is formed as a membrane clamped between said pressure chamber and said reference chamber in a pressure-tight manner and performs lifting movements providing deflection under the effect of pressure in said pressure chamber for actuating said switching contact, said membrane surface being deformable after a predetermined deflection, for indicating pressure occurring in said pressure chamber.

6. A measuring head according to claim 1, wherein: said diaphragm is formed as a ceramic oxide membrane with a sensor provided as thick-film resistors, connected electrically to a resistance measuring bridge for generating electrical signals that can be obtained as a measured pressure value upon deformation of said membrane.

7. A measuring head according to claim 1, wherein: said diaphragm is formed of metal and includes a sensor formed with strain gauges which generate electrical signals that can be obtained as a measured pressure value during deformation of said membrane.

* * * * *